Oct. 5, 1937.  F. L. MAIN ET AL  2,095,034
BRAKE MECHANISM
Filed May 15, 1936  4 Sheets-Sheet 1
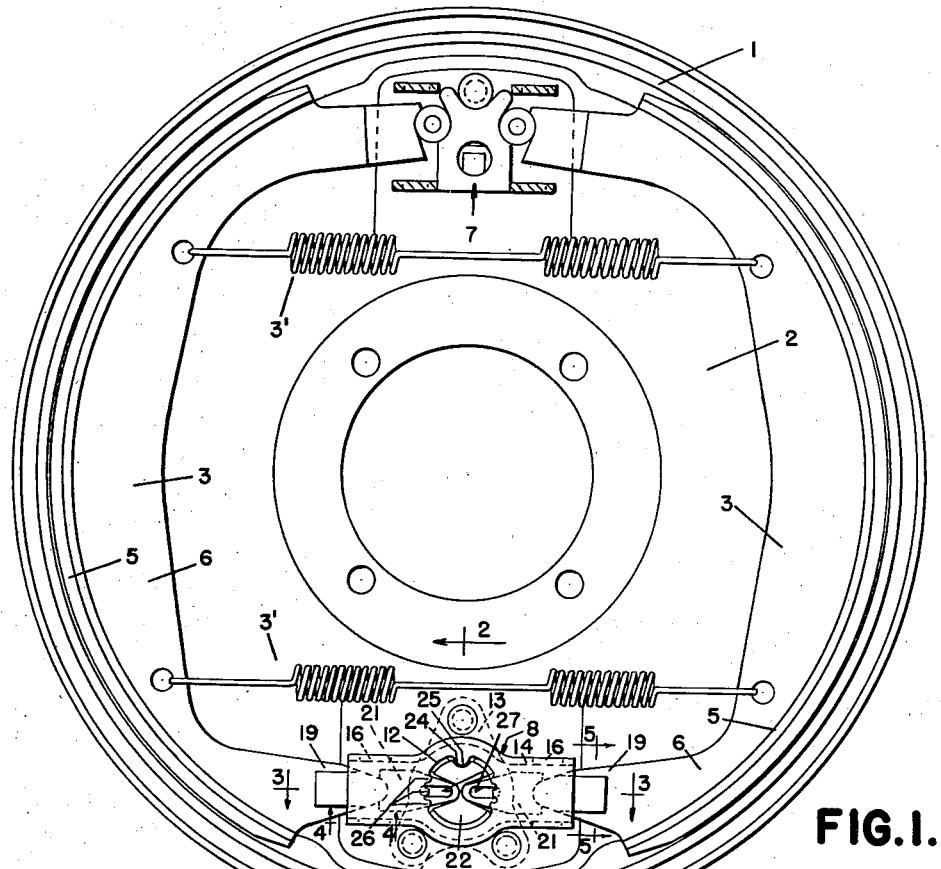
FIG.1.
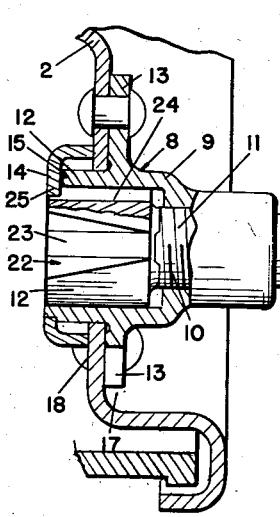
FIG.2.
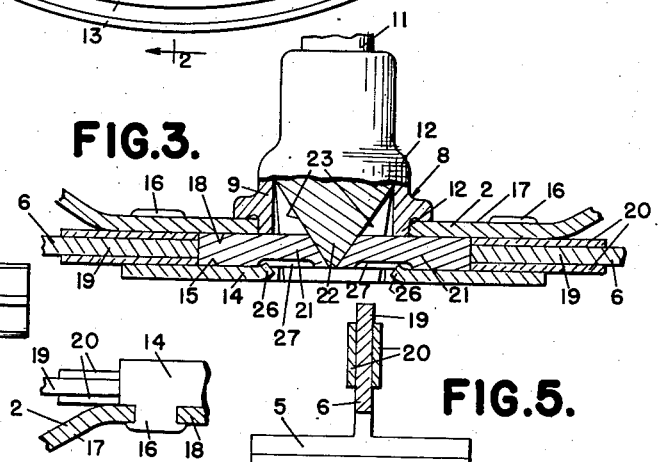
FIG.3.
FIG.4.
FIG.5.
INVENTORS
FRANK L. MAIN
CHARLES A. SAWTELLE
BY
ATTORNEYS

INVENTORS
FRANK L. MAIN
CHARLES A. SAWTELLE
ATTORNEYS

Oct. 5, 1937.   F. L. MAIN ET AL   2,095,034
BRAKE MECHANISM
Filed May 15, 1936   4 Sheets-Sheet 3

INVENTORS
FRANK L. MAIN
CHARLES A. SAWTELLE
BY Whittemore Hulbert Whittemore Belknap
ATTORNEYS Oct. 5, 1937.　　　F. L. MAIN ET AL　　　2,095,034
BRAKE MECHANISM
Filed May 15, 1936　　　4 Sheets-Sheet 4

INVENTORS
FRANK L. MAIN
CHARLES A. SAWTELLE
BY
ATTORNEYS

Patented Oct. 5, 1937

2,095,034

UNITED STATES PATENT OFFICE 2,095,034

BRAKE MECHANISM

Frank L. Main, Birmingham, and Charles A. Sawtelle, Detroit, Mich., assignors to Kelsey-Hayes Wheel Company, Detroit, Mich., a corporation of Delaware Application May 15, 1936, Serial No. 79,992

15 Claims. (Cl. 188—79.5)

The invention relates to brake mechanisms and refers more particularly to adjustment anchor devices.

The invention has for one of its objects to provide an improved adjustment anchor device which provides for all movement of its parts and the brake friction element required during the application of the brake mechanism and which also avoids binding of the parts and brake friction element. The invention has for other objects to so construct the adjustment anchor device that it serves to guide an adjustment link operatively connected to the brake friction element; that it may also serve to guide the brake friction element; and that it may be simplified and made to cooperate with the backing plate to effect the guiding. The invention has for a further object to provide a construction of adjustment anchor device the parts of which may be readily and cheaply manufactured and assembled.

The invention has for these and other objects the novel combinations and arrangements of parts as more fully hereinafter set forth.

In the drawings:

Figure 1 is a side elevation, partly in section, of a brake mechanism showing an embodiment of our invention;

Figures 2, 3, 4 and 5 are cross sections respectively on the lines 2—2, 3—3, 4—4 and 5—5 of Figure 1;

Figure 6 is a side elevation of a portion of a brake mechanism showing another embodiment of our invention;

Figures 7 and 8 are cross sections respectively on the lines 7—7 and 8—8 of Figure 6;

Figure 9 is a view similar to Figure 6 showing another embodiment of our invention;

Figures 10 and 11 are cross sections respectively on the lines 10—10 and 11—11 of Figure 9;

Figure 14:
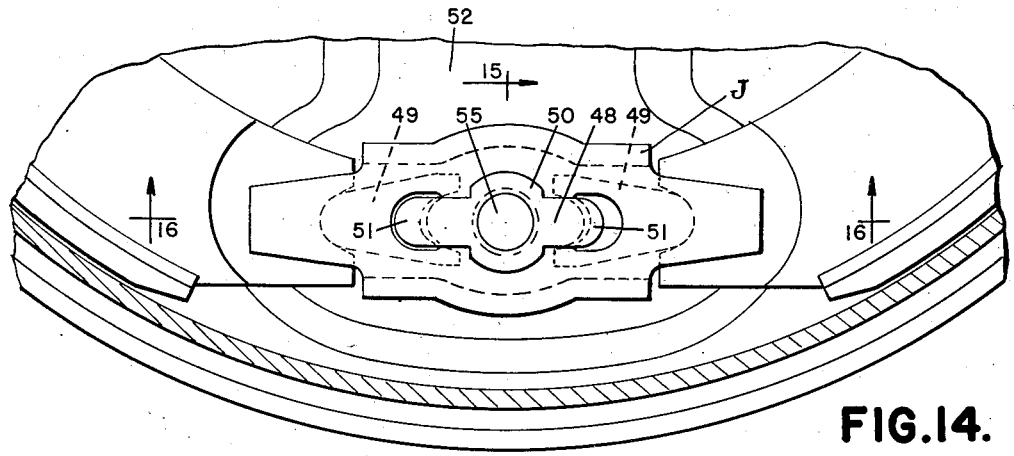
Figure 14 is a view similar to Figure 6 showing another embodiment of our invention.
Figure 16:
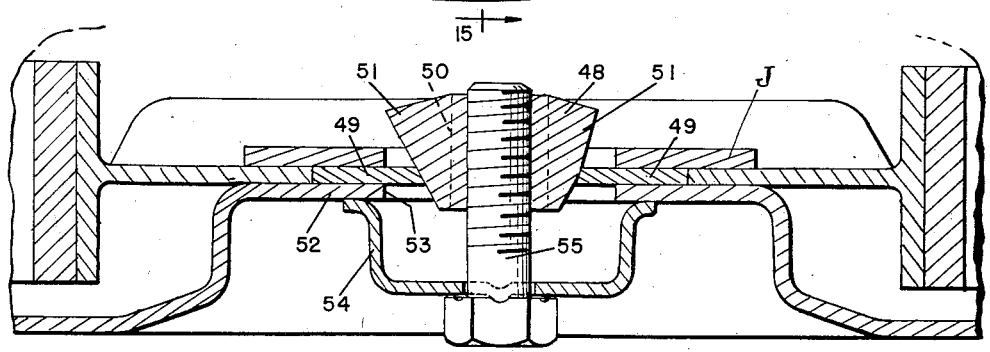
Figure 15:
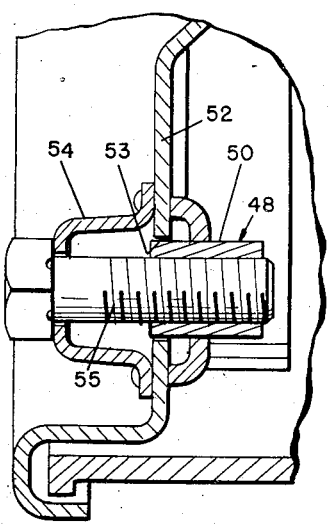

Figures 15 and 16 are cross sections respectively on the lines 15—15 and 16—16 of Figure 14.

The brake mechanism illustrated in Figures 1 to 5 inclusive comprises the brake drum 1 adapted to be secured to a motor vehicle wheel, the backing plate 2 and the brake shoes 3 within the drum and engageable with its annular brake flange 4. These shoes are of T cross section with the arcuate head 5 and the stem or flange 6, as shown particularly in Figure 5. 7 is a suitable actuator between the upper ends of the shoes for spreading the same apart and into frictional engagement with the brake flange and 8 is the adjustment anchor device between the lower ends of the shoes. 3' are suitable coil springs between the upper ends and the lower ends of the shoes for retracting and holding the same in their normal or inoperative positions.

The adjustment anchor device in general comprises an adjustment bracket having inner and outer portions respectively at the inner and outer sides of the backing plate 2. The inner portion is adapted to guide suitable elements about which the lower ends of the shoes fulcrum while the outer portion is adapted to carry suitable elements for adjusting the first mentioned elements.

More in detail, the adjustment bracket comprises the tubular member 9 at the outer side of the backing plate internally threaded at 10 for engagement with the screw 11 having a polygonal outer end for engagement by a suitable tool, such as a wrench. The tubular member has the enlarged portion 12 which extends through an opening in the backing plate and which is provided with the foot flanges 13 adapted to be fixedly secured to the outer side of the backing plate by suitable means, such as rivets. 14 is an adjustment plate at the inner side of the backing plate. This adjustment plate is preferably formed of sheet metal and has the back 15 which extends parallel to and is spaced from the adjacent portion of the backing plate. The adjustment plate also has at its sides the shouldered tongues 16 which extend transversely of the back and have shoulders abutting the backing plate and reduced portions extending therethrough and peened or riveted over against the outer side thereof.

The portion of the backing plate to which the adjustment anchor device is secured is laterally offset in an inward direction to form the recess or pocket 17, the bottom 18 of this recess or pocket being located so that the median plane of the space between this bottom and the back of the adjustment plate is in alignment with the median plane of the stems or flanges 6 of the shoes. The lower ends of the stems or flanges of the shoes are formed with the flat extensions 19 which extend toward each other and into the space formed between the back 15 and the bottom 18. These extensions have preferably secured to their opposite sides the flat wear plates 20 which with the extensions have approximately the same width as the space. 21 are flat adjustment links preferably formed of sheet metal having a thickness substantially equal to the depth of the space between the back 15 and the bottom 18. The outer ends of the links have an interfitting engagement with the cooperating ends of the extensions and plates of the shoes, the outer ends of the links being concavely rounded and the inner ends of the extensions and plates being convexly rounded.

22 is a wedge having a cylindrical body freely engaging within the enlarged portion 12. This wedge has the diametrically opposite grooves 23 which have inclined bottoms which diverge outwardly from the inner end of the wedge. The adjustment links are freely engageable in these grooves and have their inner ends engageable with the bottoms of the grooves and correspondingly inclined. The outer end of the wedge 22 abuts the screw 11 and suitable means, such as cooperating projections and recesses upon the adjacent faces of the wedge and screw, are adapted to indicate successive increments of adjustment of the wedge upon rotation of the screw.

To hold the wedge from rotation, the body of the wedge is formed with the longitudinally extending groove 24 which is engageable by the tongue 25 formed in the back 15 of the adjustment plate 14, the central portion of this back being cut away to provide an opening in substantially axial alignment with the wedge.

To prevent accidental disengagement of the links from the remaining parts of the adjustment anchor device, the back 15 of the adjustment plate 14 is formed with the bent tongues 26 which are engageable in the median grooves 27 formed in the inner sides of the adjustment links near their inner ends, the ends of these grooves being engageable with the tongues to limit movement of the links in either direction.

The widths of the shoe extensions and their plates and the adjustment links are less than the distances between the shouldered tongue 16 so that these parts may move angularly through paths parallel to the backing plate and also parallel to the path of movement of the shoes sufficiently to enable the lower ends of the friction linings of the shoes to engage the brake flange.

Figure 6:
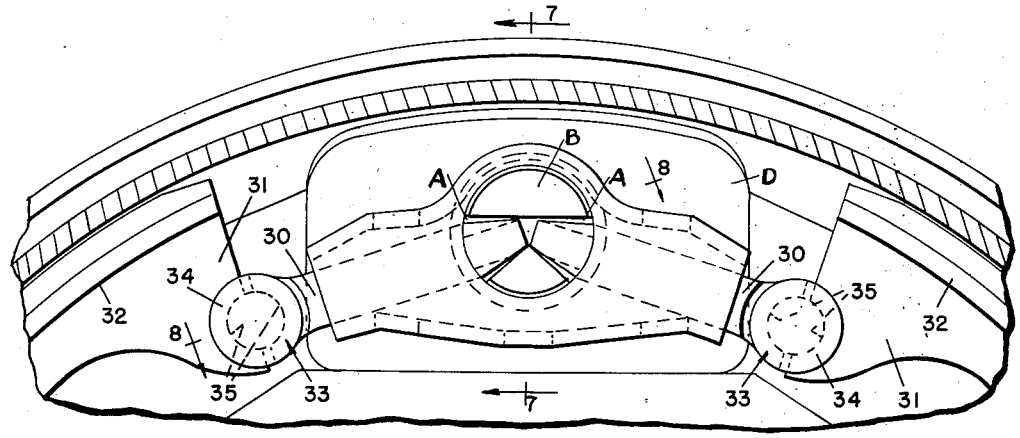
Figure 7:
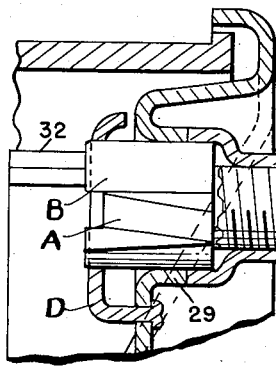
Figure 8:
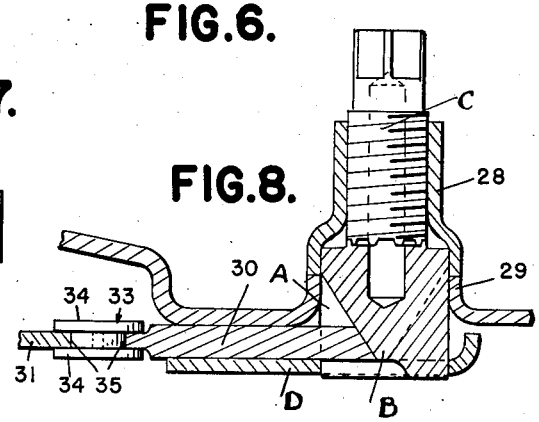

In the modification shown in Figures 6, 7 and 8, the tubular member 28 of the adjustment anchor device has an enlarged inner end which abuts and is preferably welded to an outwardly extending tubular portion 29 of the backing plate. Also in this modification the outer ends of the flat adjustment links 30 and the adjacent ends of the stems or flanges 31 of the brake shoes 32 are maintained in alignment by means of the headed pins 33 which have the heads 34 at their opposite ends located on opposite sides of the adjustment links and stems or flanges. The ends of the adjustment links and the stems or flanges are formed with concave recesses 35 for fitting the stem of the pin between its heads. However, these ends are spaced from each other to provide for relative limited angular movement of the ends of the shoes relative to the adjustment links. The inner ends of the links engage in grooves A formed in opposite sides of an adjustment wedge B slidably supported in the tubular portion 29 and advanced by a screw C threadedly mounted in the member 28. The links are held in assembled relation on the backing plate by means of a guide plate D secured to the backing plate in lateral spaced relation to the inner side thereof.

Figures 9, 10, 11 and 12 disclose another embodiment of our invention in which a flat sheet metal wedge 36 is adapted to adjust the adjustment links 37. The outer ends of these adjustment links are convexly rounded and fit in the concavely rounded inner ends of the stems or flanges 38 of the brake shoes. The inner ends of the adjustment links are bifurcated and their furcations 39 embrace the opposite edge portions of the wedge. The adjustment plate E at the inner side of the backing plate 40 is in the nature of a forging or casting which is recessed to provide the necessary space for the adjustment links and the shoe extensions. This adjustment plate E has the oblong portion 41 which is engageable with and guides the head of the wedge. The backing plate 40 has a slot 42, the sides of which also serve to guide the wedge. It will thus be seen that the adjustment plate and the backing plate which guide the wedge at longitudinally spaced points thereof hold the same from rotating or tilting angularly. The wedge is adapted to be adjusted by means of the screw 43, the inner end of which is formed with angularly spaced recesses for receiving the outer edge of the wedge which serve to indicate increments of adjustment.

Figure 9:
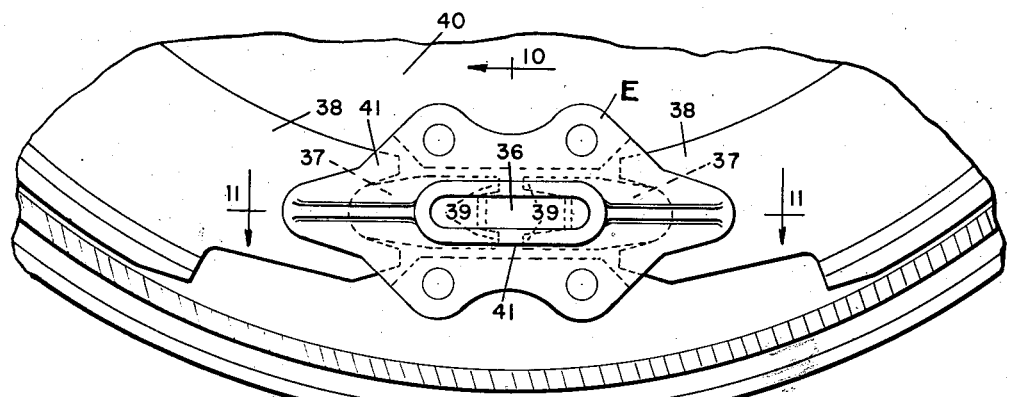
Figure 11:
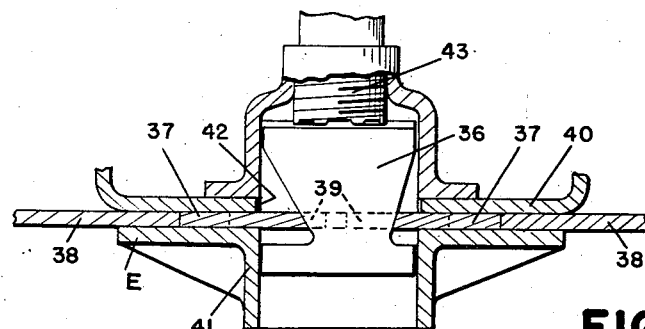
Figure 10:
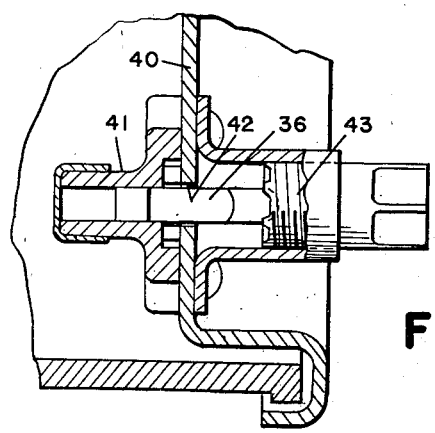
Figure 12:
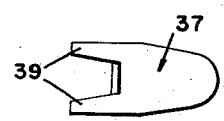
Figure 12 is a side elevation of an adjustment link.
Figure 13:
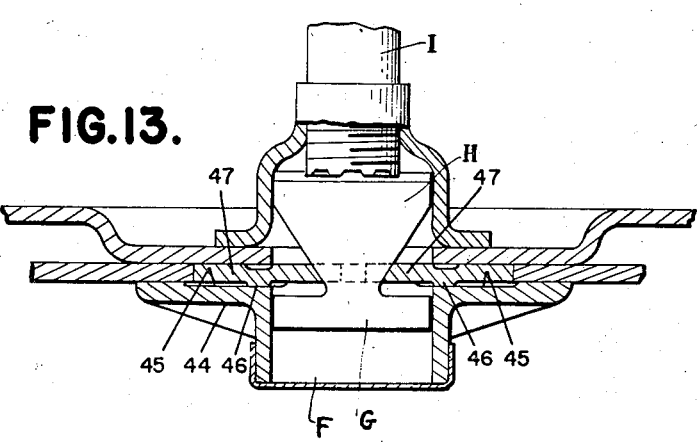
Figure 13 is a view similar to Figure 11 showing modifications.

The modification shown in Figure 13 differs from that of Figures 9, 10 and 11 in forming the adjustment plate 44 with the longitudinally extending grooves 45 for receiving the projections 46 upon the adjustment links 47 to hold the adjustment links from accidental disengagement. The projections are preferably formed by embossing the adjustment links, which are formed of flat sheet metal. The adjustment plate 44 is provided with an oblong portion F which is engageable with and guides the head G of the adjustment wedge H. A suitable screw I, similar to the screw 43, is provided for adjusting the wedge H.

Figures 14, 15 and 16 disclose another modification in which the wedge 48 for adjusting the adjustment links 49 is formed with the internally threaded hub 50 and the diametrically opposite projections 51 having their outer edges inclined and diverging relative to each other in a direction inwardly from the outer end of the wedge. In this modification the adjustment links are bifurcated at their inner ends to embrace the projections. The backing plate 52 is formed with the opening 53 for the passage of the wedge 48 and this opening is closed by the dust shield 54 secured to the outer side of the backing plate. 55 is a threaded member, such as a bolt, having its shank threadedly engaging the wedge and its head at the outer side of and abutting the shield. The inner face of the bolt is preferably formed of angularly spaced recesses adapted to cooperate with diametrically opposite projections stamped out from the shield to indicate increments of adjustment. As in the above described forms of the invention, the adjustment links are guided on the backing plate by means of an adjustment plate J secured to the backing plate in lateral spaced relation to the inner side of this plate.

What we claim as our invention is:

1. In brake mechanism, the combination with a brake drum, a backing plate, and a brake friction element within and engageable with said drum, of an adjustment anchor device comprising an adjustment bracket rigidly secured to said plate and having inner and outer portions respectively at the inner and outer sides of said plate, said inner portion being spaced from and extending substantially parallel to the adjacent portion of said plate, an adjustment link operatively connected to said friction element and guided by said inner portion and adjacent plate portion, and means carried by said outer portion for adjusting said link.

2. In brake mechanism, the combination with a brake drum, a backing plate, and a brake friction element within and engageable with said drum, of an adjustment plate secured to said backing plate and having a portion spaced therefrom, said friction element extending within the space and slidably engaging said backing and adjustment plates, and means for adjusting said friction element.

3. In brake mechanism, the combination with a brake drum, a backing plate, and a brake friction element within and engageable with said drum, of an adjustment plate secured to said backing plate and having a portion spaced therefrom, an adjustment link operatively connected to said friction element and extending within the space and slidably engaging said backing and adjustment plates, and means engageable with said link for adjusting the same.

4. In brake mechanism, the combination with a brake drum, a backing plate, and a brake friction element within and engageable with said drum, of an adjustment plate secured to said backing plate and having a portion spaced therefrom, an adjustment link operatively connected to said friction element, said friction element and link extending within the space and being guided by said backing and adjustment plates, and means engageable with said link for adjusting the same.

5. In brake mechanism, the combination with a brake drum, a backing plate, and brake shoes within and engageable with said drum, of an adjustment anchor device comprising an adjustment bracket rigidly secured to said plate and having inner and outer portions respectively at the inner and outer sides of said plate, said inner portion being spaced from and extending substantially parallel to the adjacent portion of said plate, adjustment links extending within the space and guided by said inner portion and adjacent plate portion, said links being operatively connected at their outer ends to said shoes, and means carried by said outer portion for adjusting said links.

6. In brake mechanism, the combination with a brake drum, a backing plate, and brake shoes within and engageable with said drum, of an adjustment plate secured to said backing plate and having a portion spaced therefrom, adjustment links operatively connected to said shoes and extending within the space and slidably engaging said backing and adjustment plates, and means engageable with said links for adjusting the same.

7. In brake mechanism, the combination with a brake drum, a backing plate, and brake shoes within and engageable with said drum, of an adjustment anchor device comprising an adjustment bracket rigidly secured to said plate and having inner and outer portions respectively at the inner and outer sides of said plate, said inner portion being spaced from and extending substantially parallel to the adjacent portion of said plate, adjustment links operatively connected to said shoes, said links and shoes being guided by said inner portion and adjacent plate portion, and means engageable with said links for adjusting the same.

8. In brake mechanism, the combination with a brake drum, a backing plate, and brake shoes within and engageable with said drum, of an adjustable plate secured to said backing plate and having a portion spaced therefrom, adjustment links operatively connected to said shoes, said shoes and links extending within the space and guided by said backing and adjustment plates, and means engageable with said links for adjusting the same.

9. In brake mechanism, the combination with a brake drum, a backing plate, and a brake shoe within and engageable with said drum, of an adjustment plate secured to said backing plate and having a portion spaced therefrom, an adjustment link operatively connected to said shoe and extending within the space and guided by said backing and adjustment plates, a wedge movable transversely of and engageable with said link for adjusting the same, said wedge having a longitudinally extending groove, rotatable means for adjusting said wedge, and a tongue upon said adjustment plate engageable in the groove of said wedge to hold the latter from rotation.

10. In brake mechanism, the combination with a brake drum, a backing plate, and brake shoes within and engageable with said drum, said brake shoes having flat extensions extending toward each other, of a sheet metal adjustment plate having a back spaced from said backing plate, and shouldered tongues engageable with and rigidly secured to said backing plate, flat adjustment links having their outer ends interfitting with said shoe extensions, said links and shoe extensions extending within the space between said backing plate and adjustment plate back and being guided thereby, and means for adjusting said links.

11. In brake mechanism, the combination with a brake drum, a backing plate, and a brake shoe within and engageable with said drum, of an adjustment plate secured to said backing plate and having a portion spaced therefrom, a flat adjustment link extending within the space and guided by said backing and adjustment plates, said link having an end extending adjacent to an end of said shoe, and a pin between said ends having heads at opposite sides thereof for maintaining said ends in alignment.

12. In brake mechanism, the combination with a brake drum, a backing plate, and brake shoes within and engageable with said drum, of an adjustment plate secured to said backing plate and having a portion spaced therefrom, adjustment links operatively connected to said shoes and extending within the space and guided by said adjustment plate and provided with bifurcated ends extending toward each other, and a wedge embraced by the furcations of said ends and movable to adjust said links.

13. In brake mechanism, the combination with a brake drum, a backing plate, and brake shoes within and engageable with said drum, said backing plate having a slot between adjacent ends of said brake shoes, of an adjustment plate secured to said backing plate and having a portion spaced therefrom, adjustment links operatively connected to said shoes and extending within the space and guided by said backing and adjustment plates, said links having bifurcated inner ends and a wedge embraced by said bifurcated ends and extending through the slot in said backing plate and guided by said adjustment plate, said wedge being longitudinally movable to adjust said links.

14. In brake mechanism, the combination with a brake drum, a backing plate, and a brake shoe within and engageable with said drum, of an adjustment plate secured to said backing plate and having a portion spaced therefrom, a flat adjustment link extending within the space and guided by said backing and adjustment plates, said link having an end operatively connected to one end of said shoe, and cooperating means upon said adjustment plate and link for holding said link from accidental disengagement from said adjustment plate.

15. In brake mechanism, the combination with a brake drum, a backing plate, and brake shoes within and engageable with said drum, said backing plate having an opening between adjacent ends of said shoes, of an adjustment plate secured to said backing plate and having a portion spaced therefrom, adjustment links operatively connected to said shoes and extending within the space and guided by said plate and having inner bifurcated ends, a wedge adapted to extend through the opening in said backing plate and having diametrically opposite wedge portions embraced by the bifurcated ends of said links, a dust shield secured to the outer side of said backing plate, and a threaded member carried by said shield and threadedly engaging said wedge.

FRANK L. MAIN.
CHARLES A. SAWTELLE.